April 15, 1958     F. E. ULLMAN ET AL     2,830,417
MACHINE FOR PRODUCING CONTOURED WRAPPED PACKAGES
Original Filed Dec. 6, 1949     8 Sheets-Sheet 1

April 15, 1958    F. E. ULLMAN ET AL    2,830,417
MACHINE FOR PRODUCING CONTOURED WRAPPED PACKAGES
Original Filed Dec. 6, 1949    8 Sheets-Sheet 5

April 15, 1958     F. E. ULLMAN ET AL     2,830,417
MACHINE FOR PRODUCING CONTOURED WRAPPED PACKAGES
Original Filed Dec. 6, 1949     8 Sheets-Sheet 6

United States Patent Office 2,830,417
Patented Apr. 15, 1958

2,830,417

MACHINE FOR PRODUCING CONTOURED WRAPPED PACKAGES

Fred E. Ullman, Winnetka, and King L. Klopfenstein, Arlington Heights, Ill., assignors to Triangle Package Machinery Company, Chicago, Ill., a corporation of Illinois Continuation of abandoned application Serial No. 131,326, December 6, 1949. This application September 29, 1954, Serial No. 459,048

10 Claims. (Cl. 53—226)

This invention relates to improvements in machine for producing contoured wrapped packages, and is a continuation of our co-pending application Serial No. 131,326, filed December 6, 1949, now abandoned.

The present invention is more particularly concerned with machines for producing a package of the kind consisting of the desired content, either in unitary or multiple form, and a sheet of wrapping material of an area greater than the surface area of the associated content and the central portion of which envelopes and follows generally the contour of the content and the margins of which are brought together as a mass which is then consolidated to form a stem which projects outwardly from its base on the package.

The prior art has suggested several methods of providing a wrapped package of this general order. One suggested method is to bring the margins of the wrapping material together and subject them to a twisting motion. This method results in a package having a relatively thick stem of substantially uniform circular cross section.

Another suggested method is to gather the margins of the wrapping material together in nontwisted form but in which a thick stem of square cross section is formed.

Both of the methods above referred to and the resulting packages are open to a number of objections. Certain materials suitable for wrapping are not well adapted to withstand twisting action and yet produce a satisfactory tight package. The package produced by both of the above methods have a relatively stiff thick stem not well adapted for closing by heat, pressure, stapling, gluing and the like.

Again, packages having such relatively thick stems are not well adapted to packing in containers with other like packages because the thick stem is not well adapted to be folded over against the body of the package without disrupting or tearing the material and affecting the appearance as well as the utility of the package. Nor are such thick stems well adapted to packing in containers with others, even though they could be folded over without disrupting the material, because they tend to form thick bulky masses of the sheeting material which would engage the surfaces of adjacent packages and tend to prevent compact placement of the packages in the container. In connection with packages containing edible products, such as fruits, vegetables and the like, such thick, relatively stiff stems, whether folded over for compact arrangement in a container, or left in outstanding condition, are likely to damage the product in the adjacent packages or the package itself when packed in a container, unless provided with adequate separators or other packing material which would hold the various packages in spaced relation.

The general object of the invention is to provide an improved machine for producing a wrapped package of the type to which reference has been made, and by which the production is facilitated and the package structure improved.

Again it is an object of the invention to provide a machine wherewith the improved method may be practiced.

The means for attaining the above mentioned objects of the invention, as well as others, together with the many advantages thereof, will more fully appear as the specification proceeds.

In general the improved machine includes a suitable frame, at one end of which is a table or top plate having an opening at a place therein which is termed, for convenience, the "wrapping station." At the other end of the frame is located a mechanism whereby sections or lengths of wrapping material are cut from a supply roll and fed by belts along the top plate into operative position relative to the wrapping station.

At the wrapping station end and toward one side of the frame is mounted a turret which carries a plurality of yieldable pockets or holders, each to receive an article unit to be wrapped. Suitable means are associated with the turret to rotate the same step by step, with a dwell therebetween when each holder arrives in operative relation to the loading station. The article unit, which is placed in each pocket or holder at a point to one side of the wrapping station, may constitute a single item, or such unit may consist of a number of items.

When a loaded turret pocket reaches the wrapping station, the content article or item to be wrapped, is disposed above and centrally with respect to the sheet of wrapping material at said station, previously cut from a supply roll. At said station, below the table or top, is located means yieldingly to support the package at least during part of the wrapping operation.

Means are provided for depressing the content article to be wrapped, when the same has been positioned at the wrapping station. Other means cause the wrapping of the sheet material around the content article to be wrapped and the formation of a fin-like stem closure for the package. Means are also provided to sever the excess material waste of the wrapper sheet and other means are provided to remove the waste material.

The various means all function in proper timed relation so that when the machine is in operation it is only necessary that there be deposited in each pocket of the turret the content or items to be wrapped, the remainder of the operation of the machine being entirely automatic. While not shown, if desired, means may also be provided to deposit the content articles or items to be wrapped in the pockets of the turret.

If, for any reason, a turret pocket arrives at the wrapping station without a content article or item therein, all that happens is that the sheet of wrapping material, then positioned at the wrapping station, is pushed through the pocket or holder and discharged as waste.

When a wrapped item passes out of the wrapping station, it is delivered to a moving conveyor for discharge from the machine for packing with other wrapped packages in crates, cartons and the like for shipment or storage, as the case may be.

It is believed that this general statement of operation will be helpful in understanding the operation of the method and machine illustrated in the appended drawings.

Referring now in detail to the structure of a machine capable of carrying out the improved method of forming a wrapped package, in accordance with the invention, said machine includes a suitable rectangular frame, in this instance composed of fabricated structural members, suitably secured together. However, cast frame members may be used in building the frame, if so desired.

Said frame is composed of pairs of upper and lower longitudinal side members 20 and 21 respectively, upper and lower front and rear transverse end members 22—23 respectively, which frame members are operatively secured together by and to the upright front and rear corner legs 24 and 25 respectively. The front legs 24 terminate at their top ends in the planes of the top edges of the frame members 20 and 22 and the rear legs 25 have parts 26 which extend a suitable distance above said top edges of said frame members 20 and 22. Said frame further includes pairs of upper and lower intermediate longitudinal frame members 27 and 28 respectively, which best appear in Fig. 2. The members 27 are disposed in a plane below that of the upper frame members 20 and the members 28 are disposed in the plane of the lower frame members 21. These members 27—28 are fastened at their ends to the transverse end members 22 and 23 respectively.

The upper and lower longitudinal side members 20 and 21 on the same side of the frame are further secured together toward the rear thereof by pairs of upright members 29, arranged closer to the front legs 24 of the frame than the rear legs 25. The intermediate longitudinal frame members 27—28, on the same side of the longitudinal center of the frame, are connected together by upright journal plates 31—31 arranged near the rear legs 25. Extending upwardly from the rear ends of the upper longitudinal frame members 20—20 and secured thereto and to the rear leg extension 26—26 are other upright journal plates 32—32.

35 indicates the main drive shaft of the machine, which extends transversely of the frame and is suitably journalled intermediate its ends in the plates 31—31. The driving motor, which is of the gear head type, is indicated at 36, and it is mounted upon a base 36a (see Fig. 1) which is attached to the pair of lower intermediate longitudinal frame members 28—28. The output shaft of said motor carries a friction clutch and sprocket 37 which, through a sprocket chain 38, drives sprocket 39 on the main drive shaft. The sprocket 39 has a considerably larger diameter than the sprocket 37 to complete the desired drive ratio for the shaft 35.

Fixed to the drive shaft 35, one on each side of one of the frame members 28 are cam discs 40 and 41 respectively, the latter being arranged toward one of the longitudinal side members 21. Also fixed to this drive shaft, between the sprockets 39 and the other longitudinal side members 21 are sprockets 42 and 43 respectively, the purpose of which will appear later. The cam grooves 40a and 41a of the cams 40—41 face outwardly in opposite directions.

On the front end of the frame so far described, and fixed to parts of the pair of upper longitudinal frame members 20—20 and one of the upper transverse frame members 22, is a smooth flat table plate or top 45. On the longitudinal center line of the frame, where intersected by a transverse line passing centrally between the pairs of frame uprights 30 and the center of a hollow post 155, is located a circular opening 46 which is defined by a downturned flange, as best appears in Fig. 2. This opening defines the entrance into the wrapping station of the machine which is indicated as a whole by the numeral 47, in Fig. 2. It is at this station where a flat sheet of wrapping material is transformed into enveloping relation about the item being wrapped, with a margin thereof formed into a consolidated fin or stem, as will latter appear. The rear end of said table is spaced a short distance forwardly of the upper journal plates 32.

Disposed flatwise upon the table, one on each side of the opening 46 and extending longitudinally of the table or top are relatively wide belts 50—50. At the front end of the table, the associated belts pass about pairs of idler rollers 51—52 and at the rear end of the table said belts pass about rollers 53—54. The rollers 54 are mounted upon a suitably journalled cross shaft 55, which constitutes the drive shaft for both belts 50—50. The shaft 55 is provided at one end with a driving sprocket 56 (see Fig. 5) which will be more fully referred to later.

The rear leg extensions 26—26 provide supports for pairs of upper and lower brackets 60—60 in which are removably journalled the ends of a pair of upper and lower shafts 61—61 each of which carries a supply of wrapping material in the form of a roll 62. Each bracket has pivoted thereto a weighted lever 63 for frictionally engaging the associated end of a shaft 61 to prevent it from overrunning in the pull of the material from the roll, in the feed of a length of said material to the wrapping station, as will later appear. These parts appear best in Fig. 1.

Only the material from one roll 62 is used in the operation of the machine at a given time. When said roll is exhausted the other roll is ready in place for a threading of its material through the machine so that little time is lost when a roll becomes exhausted. When the free end of the material of the second roll has been threaded through the machine, the exhausted roll may be replaced by a new roll.

The material of said roll has a width approximating the distance between the outer edges of the laps of the belts 50 on the table. This material may be of the transparent film type of which there are various kinds sensitive to combined heat and pressure.

Extending between and suitably journalled at their ends in the plates 32 is a plurality of pairs of associated transverse shafts 65—66—67—68, 69 and 70 respectively. The shafts 65—66 carry a metering roll 71 and a presser roll 72 respectively, which peripherally engage each other. The ends of the shaft 66 which extend through elongated openings (not shown) in said plates, are engaged in spring pressed journals 73, whereby the roll 72, carried by said shaft, is pressed or yieldingly urged into peripheral engagement with the metering roll 71.

Figure 8:
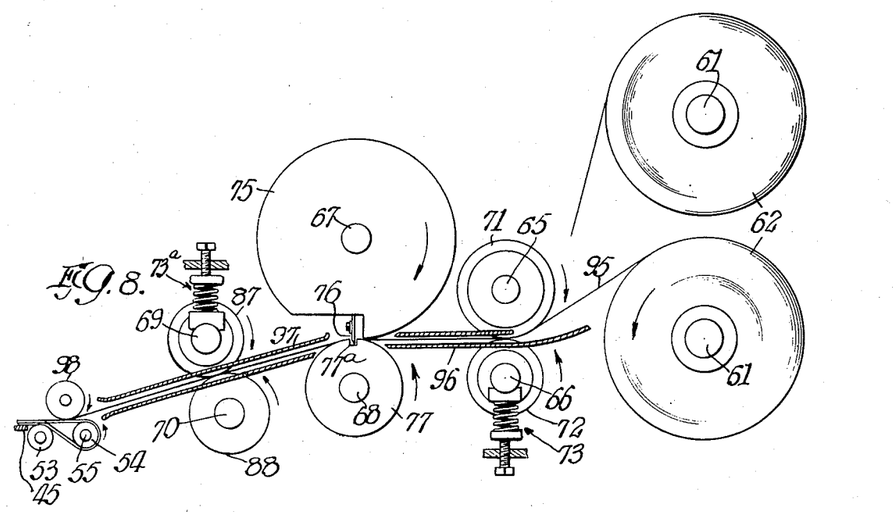
Fig. 8 is a diagrammatic view showing the wrapping material feeding means at the upper right hand end of Fig. 1.

The shaft 67 carries a plurality of laterally spaced discs 75, in the periphery of each of which is a cut out step and in said steps of all of the discs is fixed a blade 76, which best appears in Fig. 8. The peripheries of said discs mentioned are in slightly spaced relation to the periphery of a cutter roll 77 on the shaft 68 and in said roll 77 is a longtiudinal slit 77a to coact with the blade mentioned in the cutting of the wrapping material as will later appear. The shaft 67 has a gear 80 on one end thereof, which meshes wtih a smaller gear 81 on the shaft 68 (indicated in dotted lines in Fig. 1) so the drive between said shafts is such that the peripheral speed of the rolls is the same. The shaft 68 is provided at one end with a sprocket 85, which is driven by a chain 86 from the sprocket 42 on the drive shaft 35, before mentioned.

The shafts 69 and 70 carry a presser roll 87 and a puller roll 88 respectively which have peripheral engagement. The ends of the shaft 69 which also extend through elongated openings (not shown) in the plates 32, are engaged by spring pressed journals 73a similar to the journals 73 before mentioned, whereby the presser roll is pressed or yieldingly urged into peripheral engagement with the puller roll.

Figure 1:
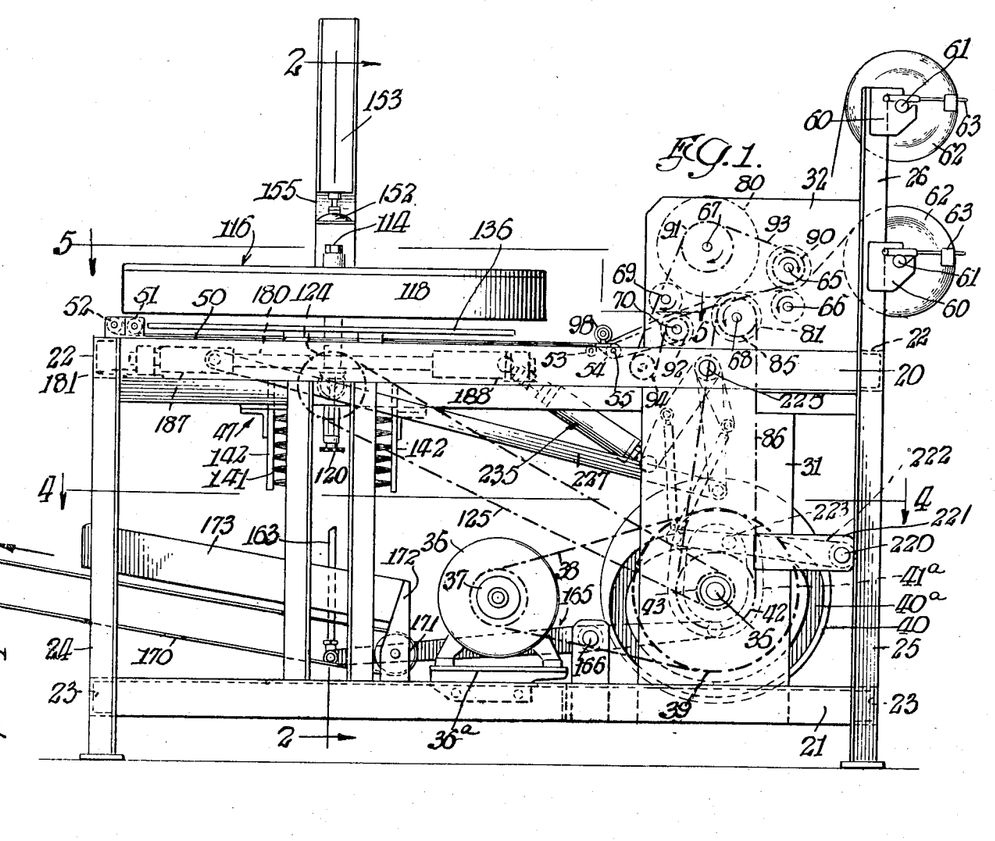
Fig. 1 is a view in elevation of that side of the improved machine, at which the operator is positioned.

The shafts 65, 67 and 70 carry spockets 90, 91 and 92 respectively at one end, which are engaged by a chain 93, which chain also passes about an idler sprocket 94 (see Fig. 1). Thus the drive to the shafts 65 and 70 is from the shaft 67, which in turn is driven by the gears 80—81 from the shaft 68. With the drive mentioned, the peripheral speed of the puller roll 88 is somewhat faster (approximately 10%) than that of the metering roll 71 and the difference in speed causes the rolls 87—88 to exert a pull on the material after it leaves the metering roll. Said material is thus tensioned and kept free from wrinkles and puckers. Once the tension is established in the sheet material, roll 88 slips sufficiently to maintain tension without adversely stretching the material. The material being under tension also enables a clean cut to be made.

In threading the material from one of the rolls 62, through the machine, a strip 95 of said material (see Fig. 8) is led between the metering roll 71 and its associated presser roll 72 and then is guided by pairs of fingers 96 between the cutter roll 77 and guide discs 75. From said last mentioned roll and disc the strip is directed by guide fingers 87 and from there passes under a guiding hold down roll 98 (see Fig. 8) which guides the strip down into a flatwise position upon the rear end of the top lap of the belts 50—50 at a point between the rollers 53—54. As before mentioned, the shaft 56 for the roller 54 is provided at one end with a sprocket pinion 56 (see Fig. 5) and this pinion is driven by a chain 99 from a sprocket 100 on the associated end of the puller roll shaft 70.

As the strip passes between the roll 77 and associated discs 75, a length is cut from the strip each time the blade 76 enters the associated slit or groove 77a and this length is then guided by the roll 98 into engagement with the top laps of the belts 50. The length of material is indicated by the numeral 105 in Fig. 5. It is to be noted that the length of sheet 105 of wrapping material rides with its lateral margins engaged upon the belts which carry it toward and positions the same in operative relation to the wrapping station 47 with the central portion of said length covering the opening 46 in the table.

110 (see Fig. 2) indicates an upright shaft located adjacent one of the upper longitudinal members 20 of the frame in that transverse plane of the frame that passes through the axis of the opening 46 in the table 45. This shaft is journalled in a part of a bracket 111 secured to said frame, which bracket includes laterally inward extensions 112 and 113 at the top and bottom respectively. Fixed in the extension 112 is a second upright shaft 114 upon which is journalled a Geneva disc 115 with which the turret 116 of the machine is associated. Said turret, which is disposed a suitable distance above the table or top 45, includes a circular top plate 117 having a depending marginal flange 118. The central portion of said top plate 117 of the turret is operatively secured to the Geneva disc 115 so that when said disc is rotated step by step or intermittently, the turret moves therewith. As best appears in dotted lines in Fig. 5, said disc has five channels and associated with said disc is a lever 119 that includes oppositely disposed arms each carrying a roller 119a for engagement in said channels. Said lever is fixed to a top end part of the upright shaft 110 that extends above the top end of the bracket 111. The bottom end of said shaft, below the bracket portion 113 has a sprocket 120 attached thereto.

Journalled in said bracket portion 113 is a short horizontally disposed shaft 121 which carries a bevel pinion 122 at its outer end, that meshes with a similar pinion 123 on the upright shaft 110. A sprocket 124 is fixed to the inner end of said horizontal shaft and it is constantly driven from the main shaft 35 by a chain 125 (see Fig. 1) trained about the sprocket 43 on said shaft. From the structure above described, it is obvious that the upright shaft 110 is constantly driven from the drive shaft 35. The purpose of the sprocket 120 on the bottom end of the shaft 110 will appear later.

In the top plate 117 of the turret are five circular openings 130 and the centers thereof are disposed 72° apart on a circle concentric with the axis of the shaft 114 and of such a diameter that a part of said circle passes through the axis of the opening 46 in the table, which opening forms the inlet for the wrapping station 47. The diameter of each opening 130 in the turret top is approximately the same as that of the inlet opening 46 for the wrapping station.

Figures 2, 3:
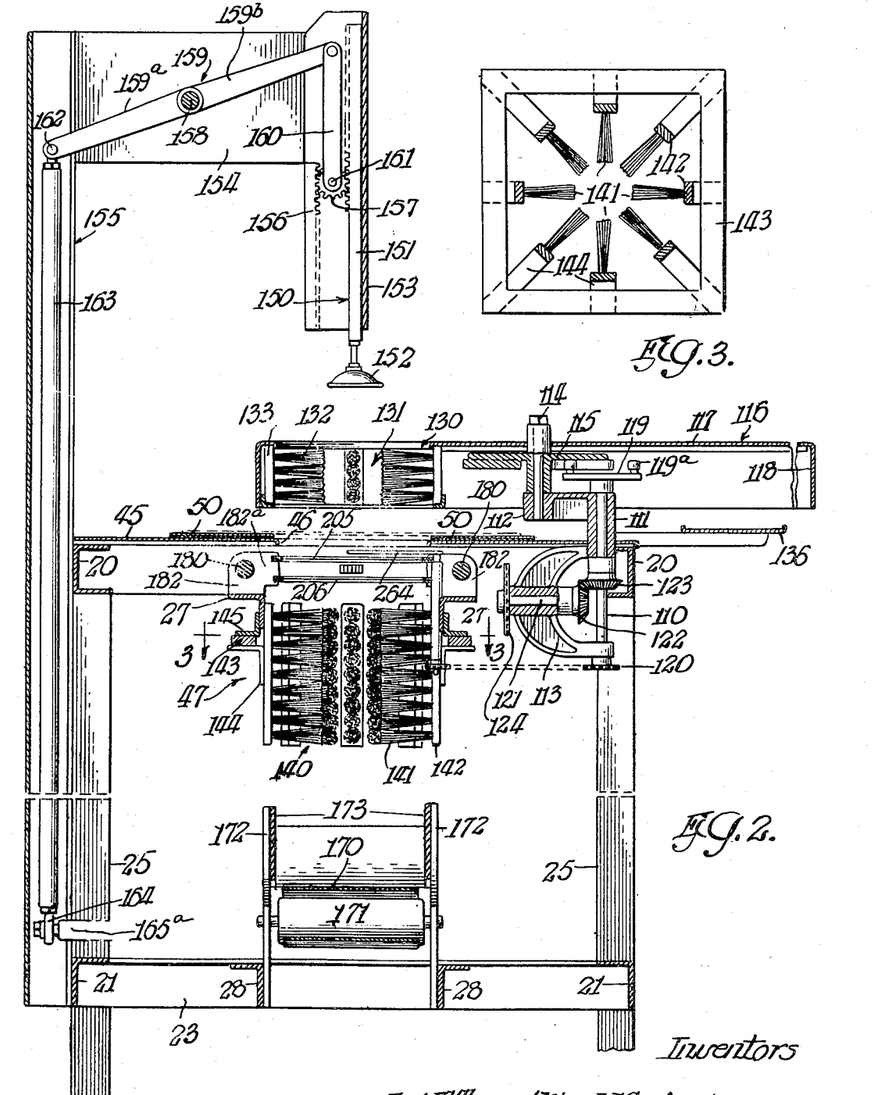
Fig. 2 is a transverse vertical sectional view through the wrapping station of the machine as taken on the line 2—2 and on a scale enlarged over that of Fig. 1.
Fig. 3 is a horizontal detail sectional view through a part of the machine as taken on the line 3—3 and on the scale of Fig. 2 and illustrates structure of an open ended basket for yieldingly holding an article in position during a wrapping operation.
Figure 5:
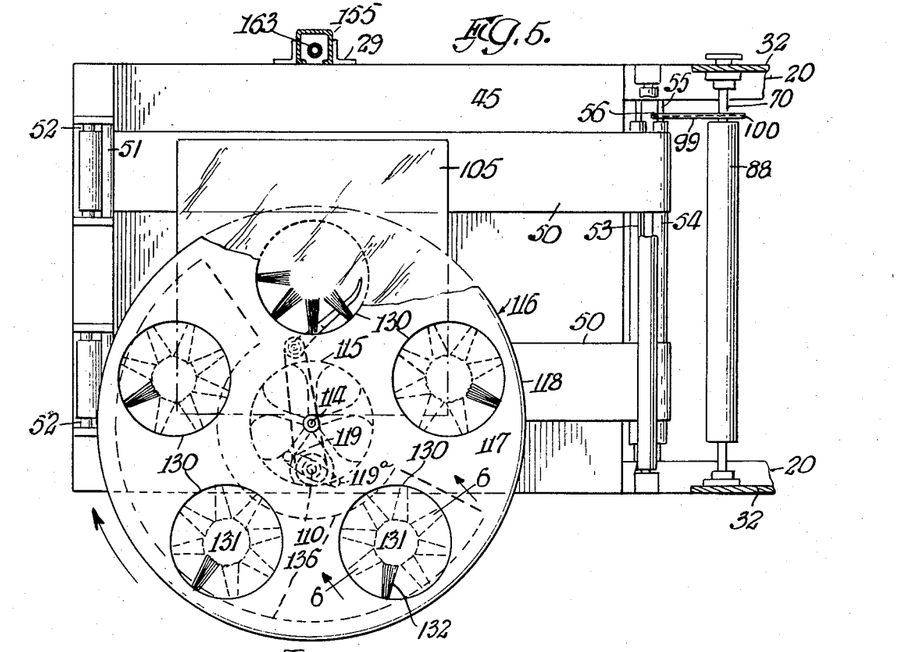
Fig. 5 is another horizontal sectional view through the machine as taken on line 5—5 and on the scale of Fig. 1 and particularly shows parts more directly associated with the wrapping station of the machine.

Each opening 130 in the turret top constitutes the inlet for an associated article holding pocket 131 best shown in Fig. 3. This pocket is defined by upright rows of radial bunches of bristles 132, the outer ends of each bunch of bristles in each row being secured in a back 133 which can be made of wood, plastic or other suitable material. The arrangement of the bristles in the various pockets is best shown in Fig. 5. These bristles are relatively long and their inner ends define a center opening in each pocket of a diameter less than that of the article being wrapped. They are stiff enough to support the article being wrapped, but flexible enough to yield when the article is pressed downwardly. The operator's station is adjacent that part of the turret at the bottom of Fig. 5 and it is from this station that the operator feeds or places an article, such for example as a head of lettuce 135 (see Fig. 6) into the pocket. As the head of lettuce is placed in each pocket 131, it will deflect the bristles therein downwardly so that they all coact to yieldingly hold and support the head of lettuce in said pocket, in such a manner that it may be pushed clear through the same when that particular pocket reaches and is positioned coincident with the wrapping station.

It is important that the article 135 be not pressed too far down into the pocket, say to the plane of the table or top 45, because if this occurs the article would engage the edge of the sheet material as it approaches the same in the intermittent movement of the turret, with resulting malfunction. Therefore, there is provided an arcuate supporting plate 136 that is positioned in a horizontal plane a short distance above the top of the table and beneath the turret. This plate, which appears in Figs. 2, 5 and 6, has a width approximating the diameter of each opening 130 in the turret and it has an arcuate length greater than the arcuate length between three of said pockets. Its trailing end, considered in the direction of the movement of the turret, terminates short of the opening 46 in the table 45.

Thus should the article 135 be pushed too far into a pocket 131, it will engage the supporting plate 136 and be limited thereby. Hence, when it leaves the trailing end of said plate, it will be moved into a position above the opening 46 in the table top and above the sheet of wrapping material 105 covering said opening.

In the rotation of the turret, there is a dwell each time one of is pockets has reached the wrapping station position and this dwell is so calculated as to afford sufficient time for the item being wrapped and associated wrapping material sheet, at said station, to be depressed downwardly of said station into an open ended article receiving means 140 at said station.

In the specific illustration is means in the form of a basket constituted by upright rows of bunches of bristles 141, with the bunches of bristles in each upright row fastened to a back 142. Each row of bristles has a length greater than the rows of bristles in the turret pockets 131 and preferably of a length greater than the axial length of the article being wrapped, such as the head of lettuce, before mentioned. The backs mentioned are arranged in a circle in a square frame 143, as best appears in Fig. 3 and each back is supported from said frame by a bracket 144. As the backs are disposed in a circle and as the frame 143 is square, it is obvious that certain of said brackets are longer than others, as appears in said Fig. 3.

The frame 143 is supported from the longitudinal members 27 of the machine frame, by means of angle bar-like members 145 that best appear in Fig. 2.

When one of the turret pockets 131, with an article 135, in this instance a lettuce head, arrives and stops in line with the table opening 46, it is disposed in a position above the sheet 105 of wrapping material and then the head is depressed downwardly, first to engage the central portion of said wrapper sheet to carry the same downwardly with it into the open top end of the basket 140. This depressing action is produced by a vertically reciprocating plunger and is substantially instantaneous. The plunger is thus able to reach a retracted position and yet provide sufficient time at said station to complete the wrapping operation, all in a short period of time.

The plunger mentioned is indicated as a whole at 150 and it includes a vertical rack bar 151 that carries a plunger cup 152 at its bottom end for engagement with the item to be wrapped. The rack bar has sliding guided bearing in a head 153 disposed in line with but at an elevation considerably above that of the table opening 46. When this plunger is in its retracted position shown in Fig. 2, its cup is disposed above the turret.

The head is supported by laterally spaced side plates 154 fixed to opposite sides of a hollow upright post 155, at one side of the frame in transverse alignment with the axis of the turret as provided by the shaft 114. This post, which is open along its lower inner side is fastened to the frame by the members 29, before mentioned.

Carried in the head 153 and spaced from but parallel with the rack bar 151 is a second rack bar 156 which extends from the lower edge of the plates 154 to the bottom end of the head. The teeth of both rack bars face each other but are laterally spaced far enough apart to receive between them a pinion 157 in meshing engagement with both rack bars.

Supported between the pair of plates 154 is a short shaft 158, upon which is rockably mounted a walking beam lever 159. One arm 159a of this lever extends into the upper end of the post 155 while the other arm 159b of said lever extends into the head 153. The free end of the last mentioned arm has pivoted thereto the upper end of a pair of links 160 and the bottom end of said links carries a cross pin 161, upon which the pinion 157 is journalled between said links. The parts above mentioned best appear in Fig. 2.

Figure 4:
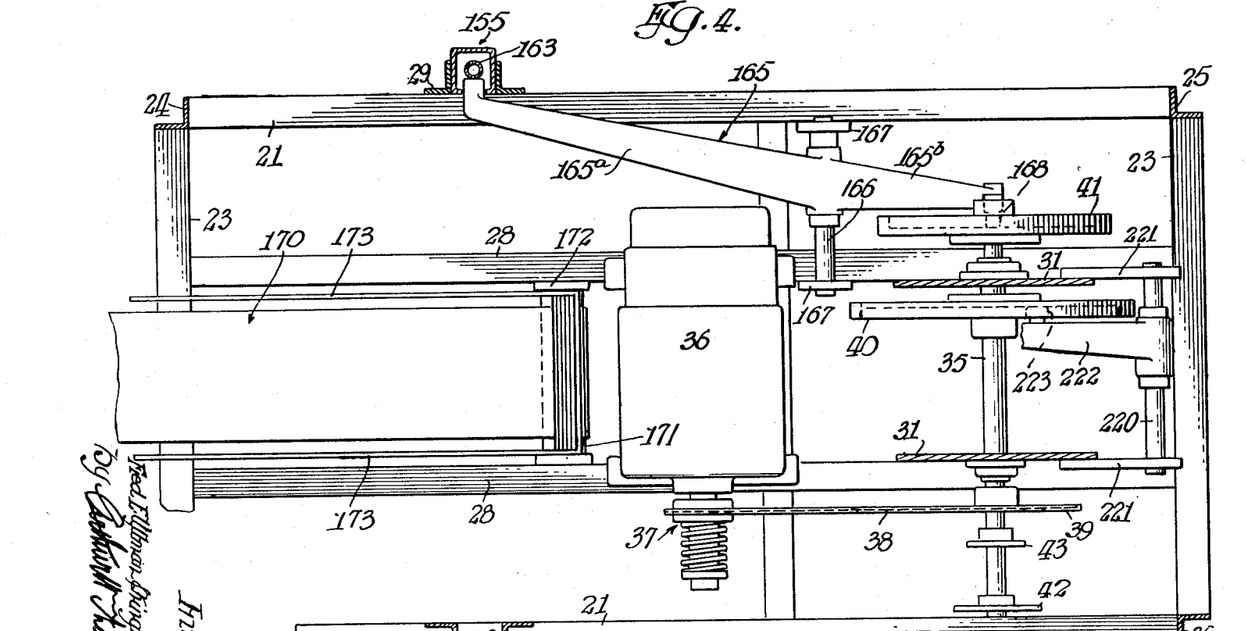
Fig. 4 is a horizontal sectional view through the machine, between the upper and lower frames thereof, as taken on the line 4—4 and on a scale enlarged over that of Fig. 1.

The free end of the lever arm 159a is pivotally connected at 162 to the upper end of a connecting rod 163 located within the post and the bottom end of said rod is pivotally connected at 164 to the free end of the load arm 165a of a walking beam lever 165, which best appears in Fig. 4. This lever is mounted for rocking movement on a short transverse shaft 166, supported by upright brackets 167 rising from two of the lower longitudinals 21 and 28 of the frame on the same side thereof. The power arm of said lever is indicated at 165b and it carries a roller 168 at its free end, which rides in the groove 41a in the cam disc 41, the shape of which best appears in dotted lines in Fig. 9.

It is obvious that in the rocking movement of the lever 165 as imparted thereto by the cam disc 41, a reciprocating motion is imparted to the connecting rod 163, which in turn rocks the lever 159 about the shaft 158 as an axis and this in turn imparts a reciprocating movement to the links 160. In this movement of the links, the pinion 157 moves therewith while meshing with the stationary rack bar 156 and the movable one of the plunger. This causes the plunger rack bar to move twice as fast and far as the movement of the pinion. Thus a long fast movement is imparted to the rack bar of the plunger compared to the movement of the pinion.

In the downward stroke of the plunger cup 152, it will first engage the article to be wrapped, disposed in the turret pocket 130, now at said station and will push the article downwardly into engagement with the central portion of the wrapper sheet 105 covering the table opening 46 and will carry said sheet downwardly therewith. In this movement of the article and wrapper, they will jointly engage the top ends of the vertical rows of bristles 141 in the basket 140 and will deflect them downwardly. However, because of their resiliency said bristles will yieldingly support the article (and wrapper sheet) now to be operated upon, in a position wherein the central portion of the wrapper sheet is swept into contoured engagement with the bottom peripheral surface of the article, with the margins M thereof directed upwardly as loose folds to a point approximately even with and above the table top, as best appears in Fig. 7.

After the completion of the wrapping operation at the wrapping station 47, as later described, the wrapped article is ejected from the basket 140 and is then removed from the machine to a place where it may be conveniently packed in cases, boxes or crates, according to the character of the article being wrapped.

One convenient form of wrapped article removing means may consist of a travelling belt 170, which travels about the roller 171 located adjacent the motor 36. This roller has a shaft, the ends of which are journalled in brackets 172 that extend upwardly from the lower longitudinal frame members 28—28. These brackets also serve to support the rear ends of side guide plates 173 for the belt, which extends forwardly from said bracket as best appears in Fig. 1. When a wrapped article has been ejected from the basket 140, it drops to the upper lap of the belt 170, forwardly of the roller 171, and is carried by said belt lap out of the machine as a whole. In this drop of the package from the basket to the belt, it is in no way injured because of the cushion action afforded by the belt. The direction of movement of said belt is indicated by an arrow in Fig. 1.

Arranged at the wrapping station and positioned between the table top 45 and the basket 140 is a mechanism whereby the upstanding margins M of the wrapper sheet are then operated upon to complete the forming of the package.

This mechanism includes a pair of longitudinal rails 180, positioned above the upper intermediate longitudinal frame members 27—27 and which are fixed at their ends in supports 181 rising from said frame members. Each rail is fixed at its middle in a block 182, the upper portion 182a which projects inwardly to a point beyond the inner face of said frame members as best appears in Fig. 2. The blocks 182 are so disposed that a vertical transverse plane extending through the centers of the blocks will include the vertical axis of the basket 140 and the axis of the shaft 114 about which the turret rotates intermittently. The rails mentioned are here shown as constituted by pieces of circular shafting and extend equal distances beyond opposite sides of said blocks.

Figure 21:
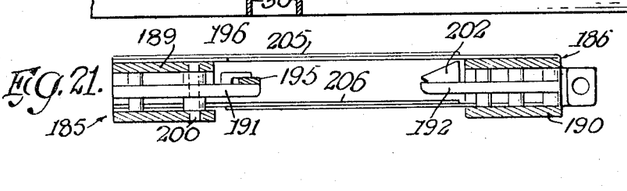
Fig. 21 is a longitudinal detail vertical section view through parts appearing in Fig. 12 as taken on the line 21—21 thereof.

185 and 186 (see Figs. 12, 13 and 14) indicate respectively a pair of front and rear carriages, which include pairs of end sleeves 187—188 that have sliding guided movement on the rails 180 toward and away from each other through means later to be descirbed. Each carriage includes a pair of vertically spaced upper and lower plates 189—190 (see Fig. 21) which are attached at their ends to said sleeves. Mounted in the carriage 185 midway between the rails 180 and between the plate thereof is a spring carriage sealer jaw 191 and mounted in the carriage 186 in a similar fashion, is a pressure carriage sealer jaw 192. These jaws are in the form of flat bars which are wider than they are thick. The inner facing ends of said jaws are provided with matching vertical corrugations 191a and 192a respectively. The inner end of the jaw 191 carries a transverse back-up bar 195, the ends of which are formed with shoulders 195a (see Figs. 14 and 16) that have guided engagement with the side edges of said jaw. This block is held in place by a hold down bar 196 which limits the rearward and upward movement of the back-up bar on the associated jaw. Each shoulder of the back-up bar has a longitudinal hole 197 therein to receive a bolt 198 (see Figs. 12 and 14) that threads into a spacer 198a between the upper and lower plates of the carriage 185. A spring 199 surrounds each bolt between the rear face of a shoulder 195a and said spacer and these springs urge the backup bar toward the other carriage until limited by the engagement of said shoulder with the heads of said bolts 198, as best appears in Fig. 14. The jaw 191 is pivoted to the carriage about a vertical axis, as indicated at 200 in Fig. 13. When the bar is in engagement with the bolt heads, as mentioned, its outer face is disposed in a plane midway between the ridges and valleys of the corrugations 191a of the jaw 191.

The jaw 192 is disposed between the plates of its carriage and is secured thereto by pins 201. The forward end of this jaw carries a cut-off knife 202, the upper surface of which is made at such an angle that its rear edge is about flush with the top of the associated carriage. By reason of the pivotal mounting of the jaw 191, it can swing laterally within a limited range, thereby enabling its corrugations 191a readily to find matching engagement with the corrugations 192a of the jaw 192.

Figures 9, 10, 11:
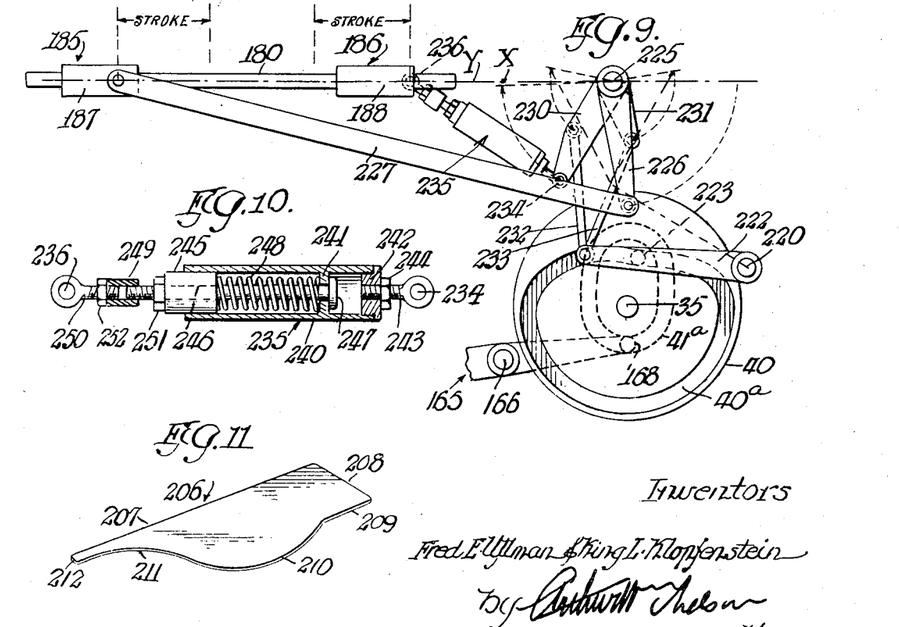
Fig. 9 is a diagrammatic view showing more particularly the mechanism for imparting reciprocating motion to the carriages and sets of gathering plates movable with said carriages.
Fig. 10 is a longitudinal detail sectional view through a certain pressure link embodied in the carriage moving mechanism of Fig. 9, on an enlarged scale, which link will be described in more detail later.
Fig. 11 is a perspective view of one of a number of gathering plates embodied in the machine, which will be more particularly referred to later.

Associated with each carriage 185—186 are pairs of upper and lower gathering plates 205—206 respectively, one of which appears best in Fig. 11. Each plate is made of thin metal and includes a straight longitudinal outer edge 207, a right angled end edge 208, a shorter straight inner edge 209 and a reversely curved inner edge comprising a rear end convex portion 210 and a front end concaved portion 211 so as to leave a narrow tip portion 212 at the front end. The plates are all of the shape described, but the convexed edge portions 210 of the lower plates are made on a shorter radius than the like edge portions of the upper plates, as best indicated by the dotted lines in Fig. 12.

Figure 12:
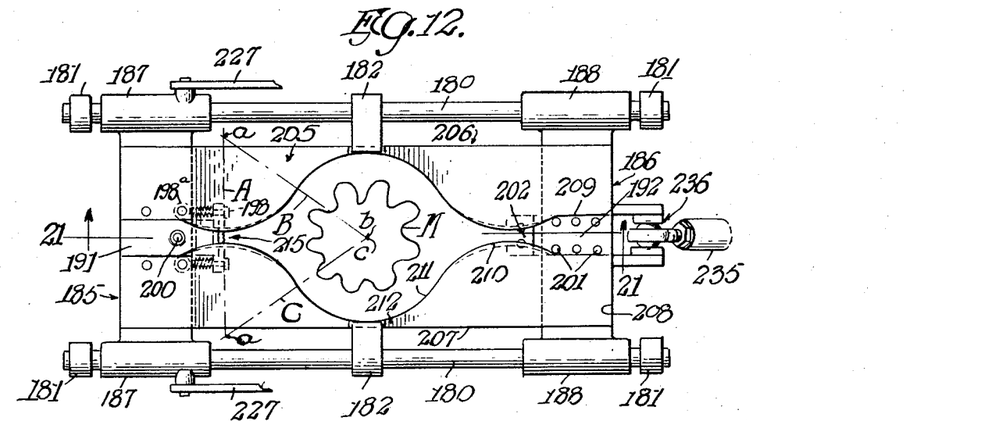
Fig. 12 is a plan view of the reciprocating carriages and associated gathering plates when said carriages are at the ends of their outward strokes and the gathering plates are in their widest open position and illustrates in the wavy line thereon the formation that marginal parts of a wrapper sheet take, when said sheet and article being wrapped have been depressed into the supporting basket, as appears in Fig. 7.

The edge portions 210 and 211 are made on substantially the same radius and when said plates are in position on the associated carriages, the plates of one carriage overlap those of the other and are secured at their outer ends to the carriage, as best appears in Fig. 12. The tip portion 212 of all of said plates slide in the blocks 182 that have grooves in their inner faces to receive the same, as best appears in Fig. 2.

In Fig. 12 there is indicated dotted lines A—B and C respectively and the axes of the edge portions 210 of said plates are made as arcs having their centers at the points a—a on the line A. The edge portions 211 of said plates are arcs of a circle having their axes at the junction of the lines B and C and which axes are indicated at b—c.

When the carriages are at the limits of their outer strokes, as in Fig. 12, which is the fully open position of said gathering plates, then the tips 212 slightly overlap and the portions 210 of said plates define throats 215 which are the narrowest at the point through which the line A passes. Said throats widen out in each direction therefrom longitudinally of the machine, as best appears in Fig. 12. It is pointed out that when said plates are in their wide open position the line A is substantially coincident with the plane of the inner corrugated end 191a of the jaw 191.

Fig. 9, which is on the order of a diagram, best shows the means whereby reciprocating motion is imparted to the carriages 185—186. At the rear end of the frame is a transverse rockshaft 220 journalled at its ends in brackets 221 (see Fig. 4) extending rearwardly of the frame plates 31—31. A lever arm 222 is mounted on and extends forwardly from said shaft and its free end projects forwardly of the plane of the drive shaft. Between its ends this arm carries a roller 223 that is operatively engaged in the groove 40a of the cam disc 40.

A second transverse rockshaft 225 is journalled at its ends in plates 31. The axis of this shaft is disposed in the horizontal plane of the carriage rail 180 and somewhat forwardly of the vertical plane in which the axis of the drive shaft 35 is located. Journalled on this shaft is a pair of depending arms 226, from which extend links 227 connecting the bottom end of each arm with the sleeves 187 of the carriage 185. (See Figs. 9 and 12.)

Also journalled on shaft 225 in the longitudinal median plane of the machine is an arm 230. Keyed to shaft 225 is an arm 231 and a pair of arms 226. Links 232—233 connect the free forward end of the lever 222 to arms 230 and 231. The arm 230 is longer than the arm 231 and the free end of said arm has pivoted thereto as at 234, one end of a spring pressure link 235, the other end of which is pivotally connected to the carriage 186 at 236.

The structure of said link best appears in Fig. 10. It includes a cylinder 240 having an internal radial shoulder 241 toward that end, in which is threaded a plug 242. This plug carries an eyed bolt 243 which affords the pivotal connection 234 and on said bolt is a nut 244, by which the bolt may be adjusted longitudinally of the plug. A second plug 245 slides in the other end of the cylinder and a relatively long bolt 246 extends through this plug. The rear end of the bolt 246 has a head 247 therein that is normally engaged with that side of the shoulder 241 facing the plug 242. A compression spring 248 surrounds that part of the bolt between the shoulder 241 and the plug 245. The front end of said bolt is connected by a union 249 to another eye bolt 250, which forms the pivotal connection 236 with the carriage. On said bolt is threaded a nut 251, which normally engages the associated end of the plug and a nut 252 on the eye bolt normally engages one end of the union. The spring 248 is a preloaded one but its stress may be made heavier or lighter by means of adjustment of the nut 251. It is important that the distance between the pivotal points 234—236 remain constant after once properly set. However, by means of the structure mentioned it is possible to change the compression of the spring 248 without affecting the distance or overall length of said link.

Fig. 9 illustrates the sweep of the various pivotal points in the operation of the machine. The pivotal point 234, as the carriage 186 is moved by the link 235 toward closed position for the other carriage 185, moves up to point X which is just below the dot and dash line Y that indicates the plane in which the axis of pivot 236 is located and which is coincident with the axes of the rails 180. In the upward swing of the arm 230 to point X it functions through the link 235 to push the carriage 186 inwardly toward the carriage 185. Prior to the final shaping of the stem closure of the package this link functions as a rigid link but as the final closure is being made and as the link 235 and arm 230 straighten out, the spring 248 is placed under further compression to increase the pressure applied to the carriage 186.

Figures 13, 16:
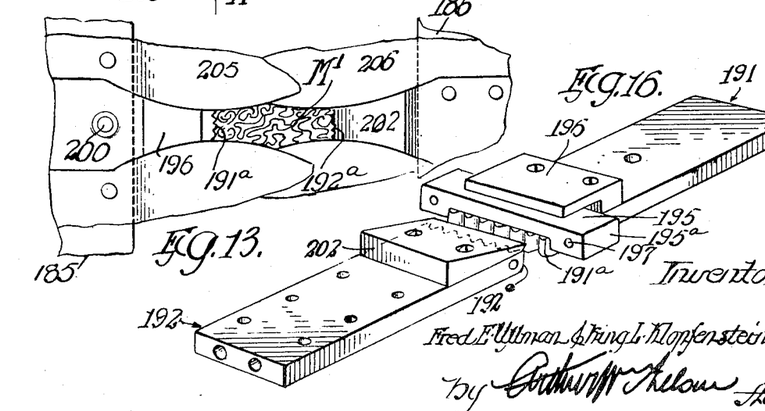
Fig. 13 is a view on an enlarged scale of fragments of the gathering plates when their supporting carriages have been moved to a position toward each other and wherein the opening formed by said plates has changed its shape and has partially gathered the margins of the wrapping material into an approximately rectangular shape, which is elongated in the direction of travel of the carriages which support said plates.
Fig. 16 is a perspective view illustrating the pressure jaws of the machine and certain parts carried by the jaws.
Figure 15:
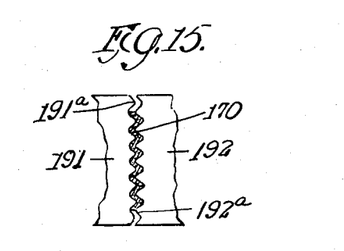
Fig. 15 is a detail fragmentary view in plan of the associated ends of the pressure jaws when in their closed position and have changed the shape of the mass formed by the gathered together margins of the wrapping material into a serpentine cross sectional shape which has a width more than ten times its thickness.

After the margins M of the wrapper sheet have been consolidated into a solid masslike stem, as illustrated in Fig. 15, the stem is trimmed at the top by the action of the knife 202 and bar 195 (see Fig. 16). The waste produced is then swept out of the zone of the sealing operation by the following mechanism.

Figures 6, 7:
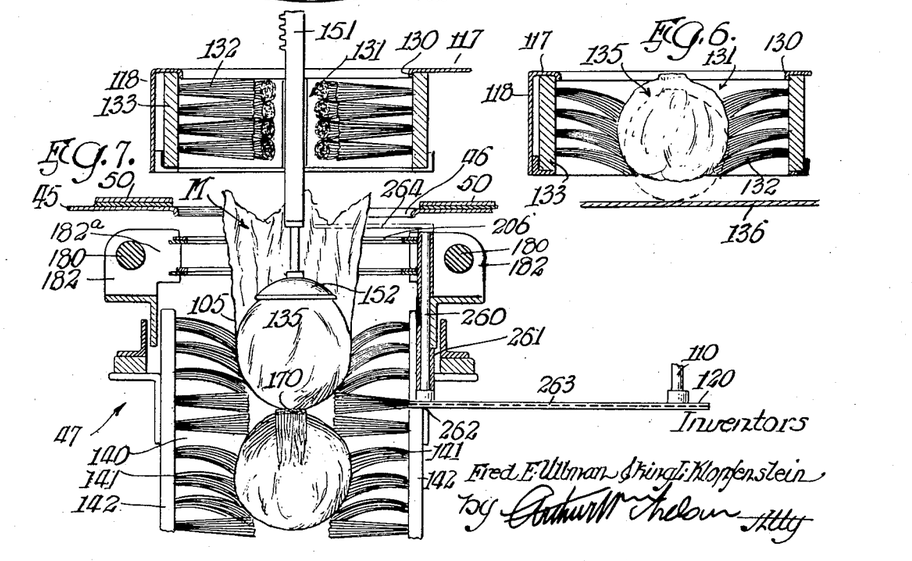
Fig. 6 is a transverse detail sectional view through one of the yielding article holding pockets in the turret of the machine, when disposed in article receiving position, as taken on the line 6—6 and on a scale greater than that of Fig. 5 and shows an article as placed within the pocket from above, by the operator and yieldably supported in the pocket, to be ejected downwardly and outwardly from said pocket when the same reaches the wrapping station of the machine, as will later appear.
Fig. 7 is a detail view, on an enlarged scale, of certain of the parts at the wrapping station appearing in Fig. 2 and illustrates more particularly the position of an article being wrapped, in association with a previously wrapped article, as being yieldably supported at said station.

As best shown in Fig. 7 there is provided an upright constantly rotating shaft 260 that is journalled in a sleeve 261 secured to a frame member 27 just outside the plane of the outer longitudinal edges 207 of the gathering plates on the same side of the machine. This shaft carries a sprocket 262 on its bottom end which is driven by the sprocket 120 on the upright shaft 110, as before mentioned. On the top end of the shaft 260 is fixed a sweep arm 264 which is disposed in a plane between the upper gathering plates and the table 45, as best appears in Fig. 7. In its sweeping movement, said arm swings over the axis of the basket 140 and sweeps the trimmed waste away for a discharge from the associated mechanism.

In the movement of the carriages toward each other, to what is called the "closed" position, the convexed rear portions 210 of the pair of plates approach each other so that they coact to provide a transition in shape of the opening from substantially central circular shape with open end extensions (see Fig. 12) to the elongated substantially rectangular shape (see Fig. 13). That is to say as said pairs of plates move inwardly the concaved edge portions of said plates start to gather the margins M of the wrapper sheet (see Fig. 7) inwardly and as the convexed edge portions 210 of said pairs of plates approach each other they produce a transition in shape of the opening from substantially the circular one of Fig. 12, to a substantially elongated rectangular one, longitudinally of the machine (as appears in Fig. 13) and wherein the margins are gathered into the mass $M^1$.

In the further inward movement of said pairs of plates they approach the final part of their movement and the convex portions of the now overlapped pairs of gathering plates, in connection with the associated corrugated jaws 191—192 gather the mass $M^1$ into a mass $M^2$ (see Fig. 14) which is substantially square in cross section and with the convolutions of the mass more tightly packed than in the mass $M^1$.

In the final movement of the carriages the jaws compress the squared mass $M^2$ into a stem or fin 170 for the package, which is at least ten times wider than it is thick and in practice it is preferred that the fin be twenty times as wide as it is thick.

Figure 14:
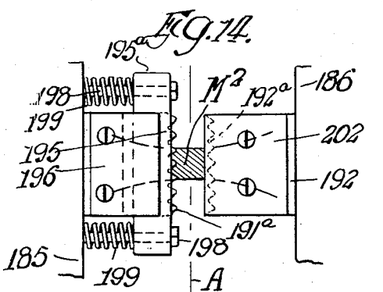
Fig. 14 is a view of parts in Fig. 12 on an enlarged scale, when said carriages have been moved further toward each other from the position of Fig. 13 and nearer toward closed position and have transformed the elongated shape of the margins being formed into a mass which is substantially square in shape.

As the jaws approach the fully closed position shown in Fig. 15, the space to the left of the line A—A in Fig. 14 widens out laterally and affords a relief for the mass in a final closing of the jaws.

As the jaws 191 and 192 approach their final position, knife 202 engages the material of the nearly completed closure, cuts through it and contacts the face of back-up bar 195. During the cutting action, or immediately after the knife 202 contacts back-up bar 195, springs 199 are compressed allowing back-up bar to move with the knife. During this action the final shaping and compression of the closure 170 takes place. When the pressure load imposed on the carriages exceeds that of the precompression of spring 248 in link 235, further compression is imposed on spring 248. By these means a package closure can be formed under high pressure, whilst permitting the operative mechanism to move through a full cycle without danger of injury to such mechanism, even through the final thickness of the package closure may vary considerably, as will be the case when closures are formed on packages of different sizes in the same machine.

In order to obtain a tight wrap around the article, the wrapping material is first primarily gathered in a direction transverse to the motion of the sealing jaws, and then held in approximately a fixed position along two sides defined by the edges of the gathering plates (see Fig. 13), until the sealing jaws are nearly together—this latter action providing primarily a gathering in the direction of travel of the sealing jaws. Just before the jaws begin to apply sealing pressure, the wrapping material is released somewhat in a direction transverse to the motion of the jaws.

Figure 17:
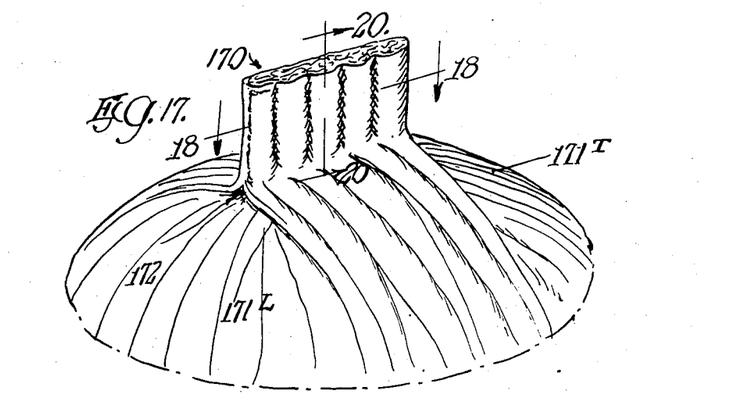
Fig. 17 is a perspective view of a portion of a wrapped package produced by the machine and illustrates more particularly the solid sealed and trimmed stem or fin thereof formed by portions of the wrapping material, which is more than ten times as wide as it is thick.
Figures 18, 19, 20:
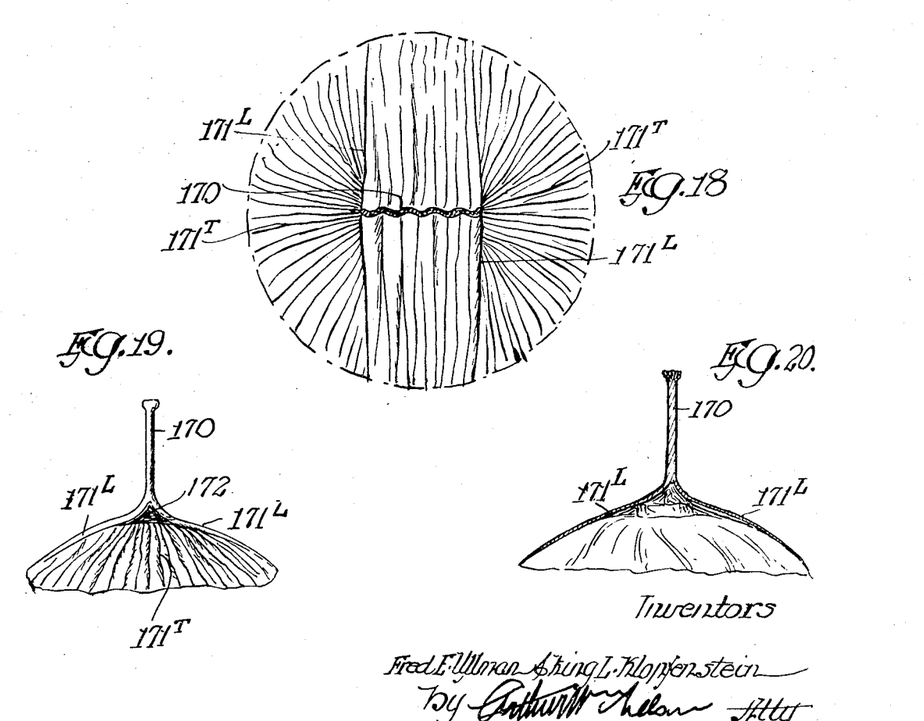
Fig. 18 is a horizontal sectional view through the stem or seal as taken on the line 18—18 of Fig. 17.
Fig. 19 is a view in elevation of portions of the package appearing in Fig. 17 and more particularly shows the appearance of the stem or fin viewed from one of the ends thereof.
Fig. 20 is a vertical section view through the stem or fin and associated parts of the wrapped package, as taken on the line 20—20 of Fig. 17.

As a result of this operation a package closure of the general form shown in Figs. 17 and 18 is provided. It will be noted that the transverse gathering, before mentioned, has resulted in first gathering certain of the material general along transverse lines or bands 171T. This results in drawing the wrapping material tightly around the article along the generally transverse sides or portions.

As the jaws move from the almost closed position of Fig. 14 to the fully closed position of Fig. 15, the material of the wrapping sheet is pulled tightly toward the stem or fin and forms itself into two longitudinally disposed bands 171L—171L extending from opposite sides of the fin or stem and terminating at a plane toward the center of the package as appears in Figs. 17 and 18.

By reason of the release of the mass M² in its transition between the cross-sectional square shape shown in Fig. 14, to the finished corrugated or sinuous shape shown in Figs. 15 and 18, the material at the lateral ends of the seal is puckered or drawn inwardly into the base of the stem as folds or pleats and there terminate in a tuck space in the finished package, indicated at 172 in Figs. 17 and 19.

By means of this method of gathering, it is possible to draw the wrapper sheet into snug contoured engagement with the article being wrapped, to leave no substantial air gap or space therein and thus cause the article to be tightly wrapped and a good, neat appearing wrap afforded for the package.

To adjust for varying degrees of tightness of wrap, it is necessary only to adjust plunger 152 vertically so that its lowermost position bears different vertical relationships, with respect to the lower gathering plates 206. The tightest wrap is obtained when the top of the article being wrapped is just below these lower gathering plates when the gathering action takes place. Progressively looser wraps will be obtained by adjusting the plunger downwardly.

As is obvious from Fig. 7, the basket 140 has a longer axial length than the diameter of the wrapped package. Therefore, a wrapped package may remain in the lower portion of the basket to be pushed out of the bottom of the basket by wrapped packages above and formed in subsequent operations of the machine.

Figure 22:
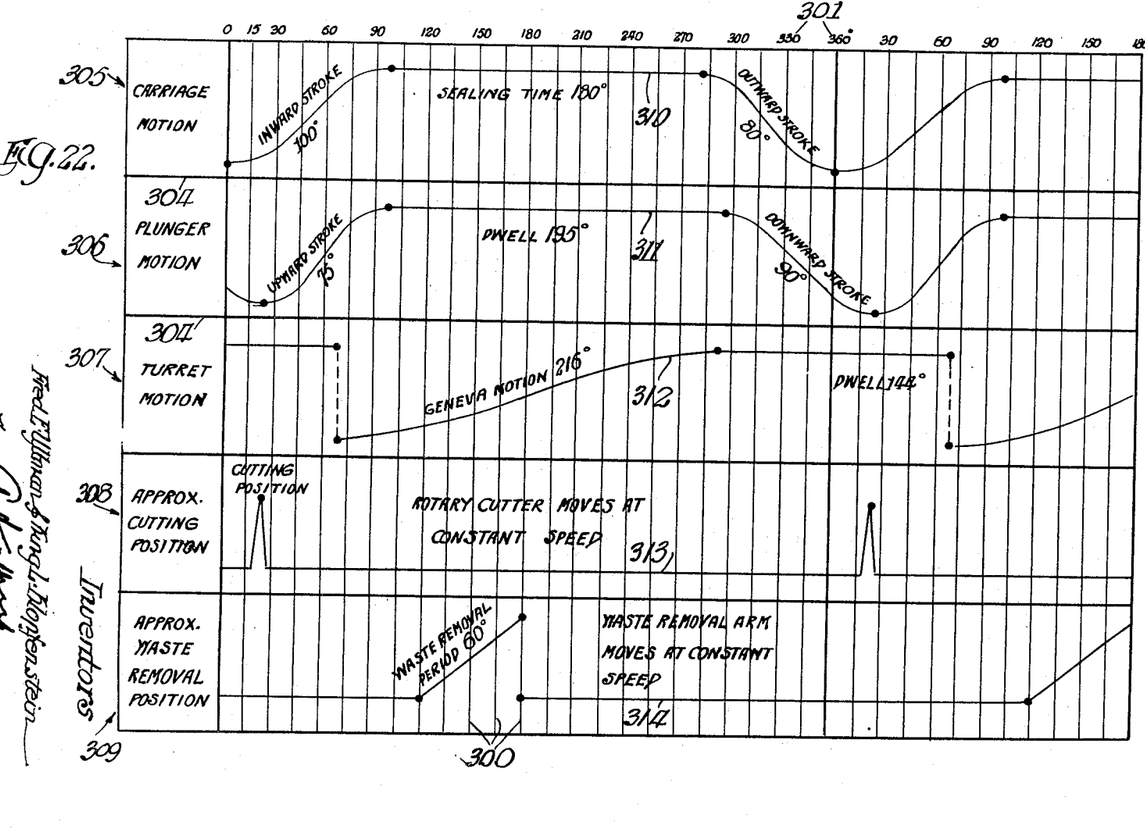
Fig. 22 is a view of a timing diagram illustrating graphically more than a complete cycle of the movement of the parts of the machine in carrying out a wrapping operation.

Fig. 22 is a view of a timing diagram illustrating graphically more than a complete cycle of the movement of the various parts of the specific machine illustrated for use in carrying out our invention. This diagram is predicated upon 360 degrees, being one revolution of the main drive shaft 35. The lines 300 are spaced apart in degrees as indicated by the numerals 301. The various lines extend transversely of the degree lines and provide a plurality of panels 305, 306, 307, 308 and 309 in which appear lines 310, 311, 312, 313 and 314 respectively, having relation one to the other and all as explained by the indicia at the left hand side of each panel.

The brush-sleeve construction used in the basket in the turret and at the wrapping station is highly satisfactory for medium weight and light weight objects which are of generally spherical shape, and not extremely fragile. Where articles to be wrapped are of a nature which renders this brush-sleeve construction impractical, other methods of support at the respective stations may be used.

In the five turret stations, the articles may be held in pockets which have slidable bottoms, or holding clamps may be provided which open when a pocket reaches a dwell position at the wrapping station, or which open during dwell at this station.

The yieldable support, illustrated as a brush-sleeve at the wrapping station, may likewise be replaced by a yieldable platform on which an article with its correspinding sheet of wrapping material may be deposited. Such a platform may be operable by mechanism which would allow it to move yieldingly downward as the article and its sheet of wrapping material move into the wrapping station. The mechanism may be provided with releasable stops at proper positions for loading the platform, wrapping the article, and/or discharging or removing the wrapped article from the platform. The operating mechanism may also provide means for moving the platform up and/or down, and/or means for tilting or rotating the platform to slide or dump the wrapped article off by gravitational force. Additional mechanism may be provided for removing the wrapped article from the platform, if desired.

Where the article to be wrapped is of sufficient weight, the platform may be operable to allow the article and its respective sheet of wrapping material to move downward to the wrapping position by its own weight. This method of reaching the wrapping position would eliminate the necessity for the plunger for positively pressing the article downwardly.

The method of making a package closure as thus far disclosed indicates that a tightly-compressed fin-type stem is established at the point of closure. The method of maintaining such a closure may vary widely where different types of wrapping material are used.

Where a heat-sealable wrapping material is employed, such as heat-sealing cellophane, the sealing jaws may be equipped with means for attaining and maintaining proper heat-sealing temperatures, and the fin closure may thereby be heat-sealed. Fig. 22 is a timing chart for the timing of a machine for making a heat-sealed fin closure.

In the use of almost any type of sheet wrapping material, the closure may be maintained by use of one or more staples made of metal or other satisfactory material. Where stapling is employed, one sealing jaw may be made to act as the stapling anvil, while the opposite jaw may include means for feeding and inserting one or more staples into the fin closure. Similarly the sealing jaws may be contoured so that one acts as a punch-like cutter and the other an anvil-folder so that one or more slugs of the material in the seal may be cut and folded in such a manner as to act as staples in maintaining the closure. Some wrapping material may be employed where crimping alone is sufficient to maintain the closure and in such cases the jaws may be contoured for such crimping. In such applications, stapling, folding and/or crimping, the carriages may be made to operate without dwell time, as necessary in heat sealing and the productivity of the machine correspondingly increased.

Glue may be employed as a seal-maintaining medium. Where glue is employed it may be applied to limited areas of both sides of the wrapping sheet by means incorporated with the wrapper cutting and feeding mechanism. Heated jaws may be employed to cause the glue to "set" faster and thereby obtain satisfactory seals in minimum of time. Where glue is used as the seal-maintaining medium, the spaces of the jaws contacting the glued wrapper may be made of material repellent to glue so that glue will not accumulate thereon.

Where a weldable wrapping material is employed, such as polyethyelene, a closure-making mechanism may include means for welding the fin closure to maintain the seal.

While in describing the invention we have referred in detail to the form, construction, arrangement and operation of the various parts, the same is to be considered only in the illustrative sense and we do not, therefore, wish to be limited theerto except as may be specifically set forth in the appended claims.

We claim:

1. In a machine of the kind described, a wrapping station, means for supporting a sheet of wrapping material at said station, depressing means at the wrapping station, article supporting means arranged below said sheet for yieldably supporting the article being wrapped after said article and the central portion of said sheet are jointly depressed into said article supporting means, with the central portion of said sheet engaging about the bottom of the article and with marginal parts of the sheet extending upwardly therefrom into a plane above the top of said article as loose folds, means for gathering the upper portions of said folds into a convoluted mass while drawing the lower portions of said folds into contoured engagement with the upper portion of said article, said gathering means comprising two pairs of plates having spaced apart facing edges to provide slot-like openings at the ends and an intermediate central substantially circular opening, the said slot-like openings being intermediately constricted.

2. In a machine of the kind described, a wrapping station, means for supporting a sheet of wrapping material at said station, depressing means at the wrapping station, articles supporting means arranged below said sheet for yieldably supporting the article being wrapped after said article and the central portion of said sheet are jointly depressed into said article supporting means, with the central portion of said sheet engaging about the bottom of the article and with marginal parts of the sheet extending upwardly therefrom into a plane above the top of said article as loose folds, means for gathering the upper portions of said folds into a convoluted mass while drawing the lower portions of said folds into contoured engagement with the upper portion of said article, said gathering means comprising two pairs of plates having spaced apart facing edges to provide slot-like openings at the ends and an intermediate central substantially circular opening, the said slot-like openings being intermediately constricted, and coacting means for applying heat and pressure to said mass from opposite sides thereof to compact the mass into a consolidated stem.

3. In a machine of the kind described, coacting carriages mounted for guided movement toward and away from each other between opened and closed positions, wrapping material gathering means carried by each carriage, each gathering means including a pair of gathering plates, each having concaved and convexed inner active edge portions, with the convexed portions of said edges for each pair of plates defining a throat portion that is narrower than the opening defined by the remainder of said edge portions, a presser jaw mounted for movement on each carriage for applying pressure to wrapping material between them when said carriages are in the closed position, and coacting cutter members movable with said jaws for cutting said material in a plane above that of said jaws.

4. In a machine of the kind described, coacting carriages mounted for guided movement toward and away from each other between opened and closed positions, wrapping material gathering means carried by each carriage, each gathering means including a pair of gathering plates, each having concaved and convexed inner active edge portions, with the convexed portions of said edges for each pair of plates defining a throat portion that is narrower than the opening defined by the remainder of said edge portions, a presser jaw mounted for movement on each carriage for applying pressure to wrapping material between them when said carriages are in the closed position, and a member having a knife edge movable with one of said jaws, and a backing bar yieldably mounted on the other of said jaws and cooperating with said knife edge for cutting said material in a plane above said jaws when said carriages are in their closed position.

5. In a machine of the class described, a structure for gathering the margin of the wrapping material to form a closure for a wrapped package and comprising two pairs of plates mounted for inward and outward movement, the plates of each pair having spaced apart facing edge portions formed to coact with the like edge portions of the plates of the other pair to provide a central substantially circular opening when said plates have moved outwardly and each pair of plates having other edge portions which coact to form a slot-like opening at each end of said pairs of plates, said slot-like openings being constricted intermediately of their ends.

6. In a machine of the kind described, a pair of pressure applying jaws mounted for guided movement toward and away from each other between opened and closed positions, said jaws having opposed pressure applying end surfaces, a knife member mounted on one of said jaws and having a cutting edge arranged substantially parallel the end surface of said one of said jaws, a back up bar mounted on the other of said jaws for a yielding guided movement relative to said jaw for cooperation with said cutting edge in performing a cutting operation, as said jaws approach said closed position.

7. In a machine of the class described, a structure for gathering the margin of the wrapping material to form a closure for a wrapped package and comprising two pairs of plates mounted for inward and outward movement, the plates of each pair having spaced apart facing edge portions formed to coact with the like edge portions of the plates of the other pair to provide a central substantially circular opening when said plates have moved outwardly and each pair of plates having other edge portions which coact to form a slot-like opening at each end of said pairs of plates, said slot-like openings being constricted intermediately of their ends.

8. In a contour wrapping apparatus, an article wrapping station, wrapping material gathering means associated with said station and including carriages having guided movement in opposite directions toward and away from said station, upper and lower pairs of gathering members movable with each carriage alternately from their outer open nongathering position to their inner closed gather position relative to said station, the gathering members of each pair having gathering edges so formed that when said upper and lower pairs of gathering members are in said nongathering position they coact to define an opening for the passage therethrough into said station of the article to be wrapped along with the central portion of the wrapping material while turning the margin of said material upwardly about and above the sides of said article, said edges of said upper and lower pairs of gathering members as said carriages move toward said station and said closed position coacting to change the shape and reduce the area of said opening while gathering the upturned margins of the wrapper sheet together as a mass at a point on the article inwardly of its sides, and means movable with said carriages arranged between the gathering members of each pair on the associated carriage and coacting with each other as said carriages approach each other in their movement toward said station for compacting said mass to form a stem.

9. In a contour wrapping apparatus, an article wrapping station, wrapping material gathering means associated with said station and including crrriages having guided movement in opposite directions toward and away from said station, a pair of gathering members movable with each carriage alternately from their outer open nongathering position to their inner closed gathering position relative to said station, the gathering members of each pair each having a reversely curved operative gathering edge and which edges of both pairs of gathering members, when said members are in said nongathering position, coact to define an opening for the passage therethrough into said station of the article to be wrapped along with the central portion of the wrapping material while turning the margins of said material upwardly about and above the sides of said articles, said edges of said pairs of gathering members as said carriages move toward said station and said closed position coacting to change the shape and reduce the area of said opening while gathering the upturned margins as a mass at a point on the article inwardly of its sides, and means movable with said carriages and arranged between the gathering member of each pair and coacting with each other as said carriages approach each other in their movement toward said station for compacting said mass to form a stem.

10. In a contour wrapping apparatus, an article wrapping station, wrapping material gathering means associated with said station and including carriages having guided movement in opposite directions toward and away from said station, upper and lower sets of pairs of gathering members movable with each carriage alternately from their outer open nongathering position to their inner closed gathering position relative to said station, the gathering members of each pair having gathering edges so formed that when said upper and lower pairs of gathering members are in said nongathering position they coact to define an opening for the passage therethrough into said station of the article to be wrapped along with the central portion of the wrapping material while turning the margin of said material upwardly about and above the sides of said article, said edges of said upper and lower sets of pairs of gathering members as said carriages move toward said station and said closed position coacting to change the shape and reduce the area of said opening while gathering the upturned margins of the wrapper sheet together as a mass at a point on the article inwardly of its sides, and means positioned between the upper and lower sets of pairs of gathering members, intermediate the sides of said pairs of gathering members and movable therewith for compacting said mass to form a stem.

References Cited in the file of this patent

UNITED STATES PATENTS

| | | |
|---|---|---|
| 1,200,365 | Kempf | Oct. 3, 1916 |
| 1,352,221 | Reifsnyder | Sept. 7, 1920 |
| 2,001,074 | Stout | May 14, 1935 |
| 2,009,241 | Roberts | July 23, 1935 |
| 2,070,736 | Johnson | Feb. 16, 1937 |
| 2,533,738 | Moore | Dec. 12, 1950 |
| 2,554,841 | Rumsey | May 29, 1951 |
| 2,622,380 | Snyder | Dec. 23, 1952 |
| 2,624,993 | Robertson | Jan. 13, 1953 |
| 2,656,657 | Bartle | Oct. 27, 1953 |

FOREIGN PATENTS

| | | |
|---|---|---|
| 616,757 | Germany | Sept. 12, 1935 |